J. L. STUART.
GROMET MAKING AND SETTING MACHINE.
APPLICATION FILED NOV. 17, 1916.

1,249,238.

Patented Dec. 4, 1917.
7 SHEETS—SHEET 3.

J. L. STUART.
GROMET MAKING AND SETTING MACHINE.
APPLICATION FILED NOV. 17, 1916.

1,249,238.

Patented Dec. 4, 1917.
7 SHEETS—SHEET 4.

WITNESS
Wm F. Drew

INVENTOR.
John Lenard Stuart
BY
Booth & Booth,
ATTORNEYS.

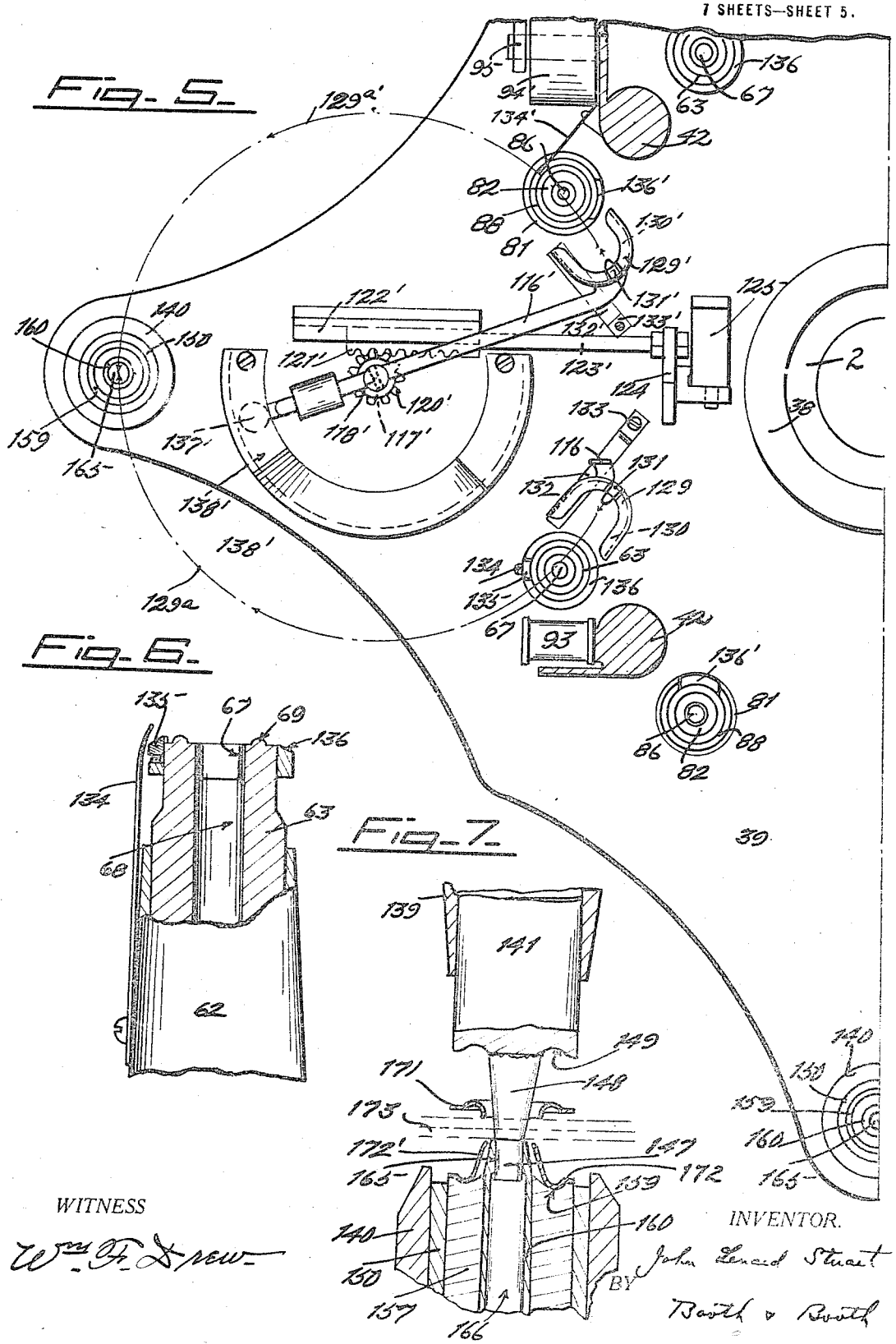

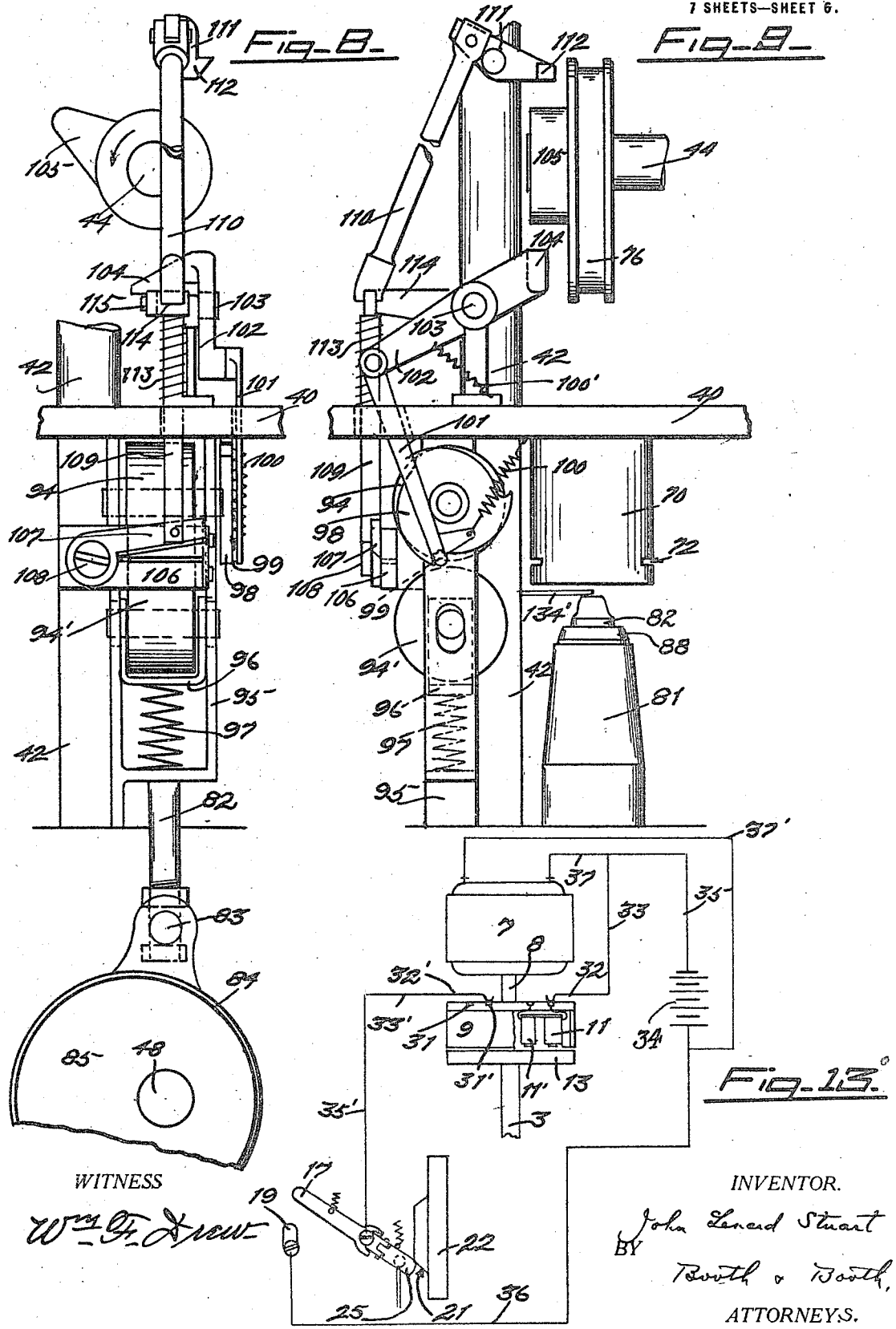

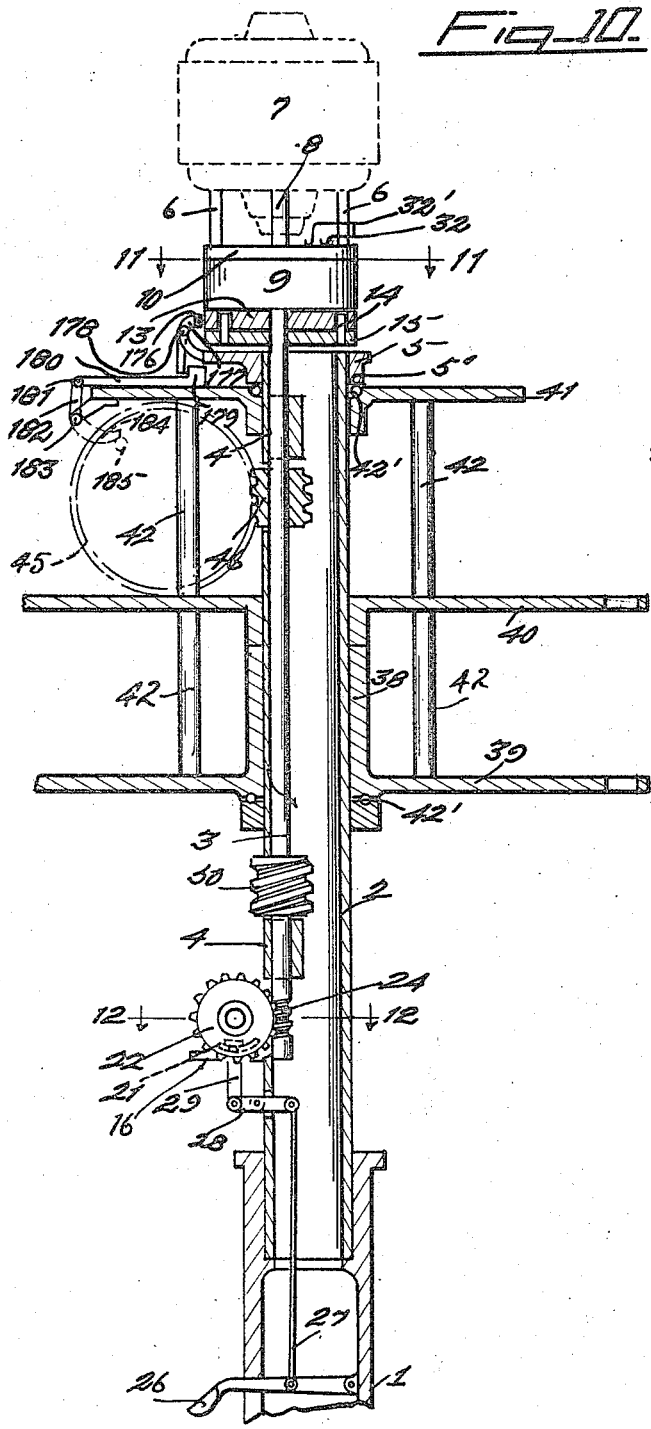
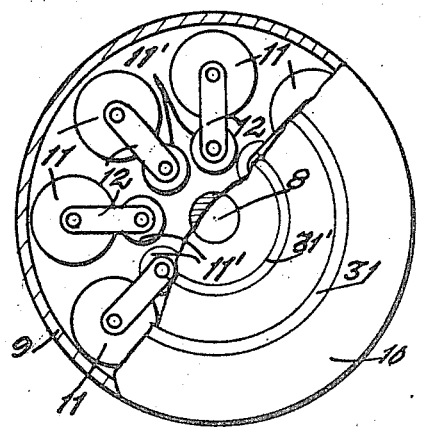
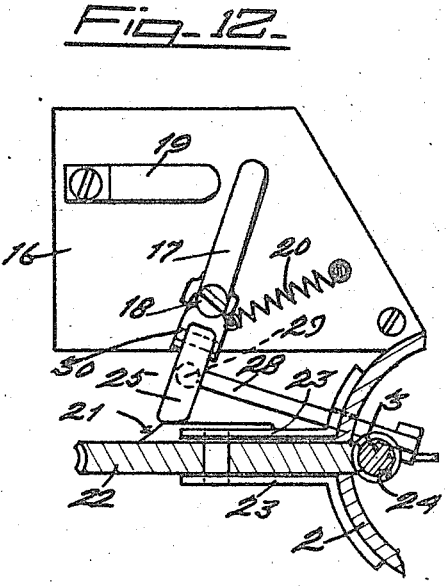

UNITED STATES PATENT OFFICE.

JOHN LENARD STUART, OF OAKLAND, CALIFORNIA, ASSIGNOR TO STUART MACHINE CO., OF SAN FRANCISCO, CALIFORNIA, A CORPORATION OF CALIFORNIA.

GROMET MAKING AND SETTING MACHINE.

1,249,238.    Specification of Letters Patent.    Patented Dec. 4, 1917.

Application filed November 17, 1916. Serial No. 131,932.

*To all whom it may concern:*

Be it known that I, JOHN LENARD STUART, a citizen of the United States, residing at Oakland, in the county of Alameda and State of California, have invented certain new and useful Improvements in Gromet Making and Setting Machines, of which the following is a specification.

My invention relates to a machine for making gromets and setting the same in fabric or other material.

The object of the invention is to provide a machine of the type described which automatically forms a gromet and a coöperating washer, which punches a hole in the fabric or other material to which the gromet is to be applied, and which sets the gromet and its washer in the hole thus formed. These operations are done automatically, and in such rapid succession that the entire cycle of operations for the making and setting of one gromet is completed in approximately two seconds.

A further object of the invention is to provide a machine which can be instantly adjusted to make and set gromets of various sizes and types, so that the operator may set gromets of any desired size or type, within the limits of adjustability of the machine, without appreciable delay.

My invention is herein described, and herewith illustrated, as a machine for making and setting gromets, for the reason that such is the principal use for which the machine is designed, but it will be apparent that the device may be readily adapted to the making and setting of other similar objects, such for example as eyelets, without involving any material changes in the essential principles of the invention, or departing in any degree from the spirit thereof. Similarly, changes may be made in the form and construction of the machine, for reasons of mechanical or structural practicability, without affecting the principles of the invention, and it is therefore my wish to be understood as claiming the invention, in the claims hereto appended, as broadly as the state of the art will permit.

My invention will be fully described with reference to the accompanying sheets of drawings, wherein—

Fig. 5 is a sectional plan, taken on the line 5—5 of Fig. 4, and viewed in the direction of the arrows.

Fig. 6 is a vertical part-sectional detail, enlarged, of the lower washer forming die.

Fig. 7 is a vertical part-sectional detail, enlarged, of the punching and setting dies, showing a gromet about to be set thereby.

Fig. 8 is an end elevation of the metal web feeding and cutting means.

Fig. 9 is a front elevation of the same, showing also portions of the gromet forming die.

Fig. 10 is a central vertical section of the frame and drive mechanism of the machine, other parts being omitted for the sake of clearness.

Fig. 11 is a partly broken plan view of the magnetic clutch, taken in the direction of the arrows on the line 11—11 of Fig. 10.

Fig. 12 is a part-sectional plan detail of the switch for controlling the magnetic clutch, taken in the direction of the arrows on the line 12—12 of Fig. 10.

Fig. 13 is a diagram of the electric circuits and connections for operating the driving motor and the magnetic clutch.

The machine comprises broadly a central supporting column, within which is carried a vertically disposed drive shaft, and surrounding said column, and supported thereby, is a rotatable turret, upon which are carried a plurality of symmetrically disposed sets of mechanism, similar in all respects except in the size or type of the gromet formed thereby, each set being capable of forming and setting a complete gromet. All of said sets of mechanism are adapted to be operated by the one centrally disposed drive shaft, and the machine is so constructed that, by a partial rotation of the turret, any one set may be carried into operative relation with said drive shaft.

Thus the operator may make use of any size or type of gromet without changing his position or that of his work, by merely rotating the turret to bring the proper set of mechanism into play.

In the accompanying drawings, I have shown a machine having four sets of mechanism, but it is to be understood that any number of such sets may be employed, the number thereof being dependent upon structural considerations. Inasmuch as all of said sets of mechanism are identical in construction except as regards the size or type of the gromet formed and set thereby, the following description will be confined to one set.

Figure 1:
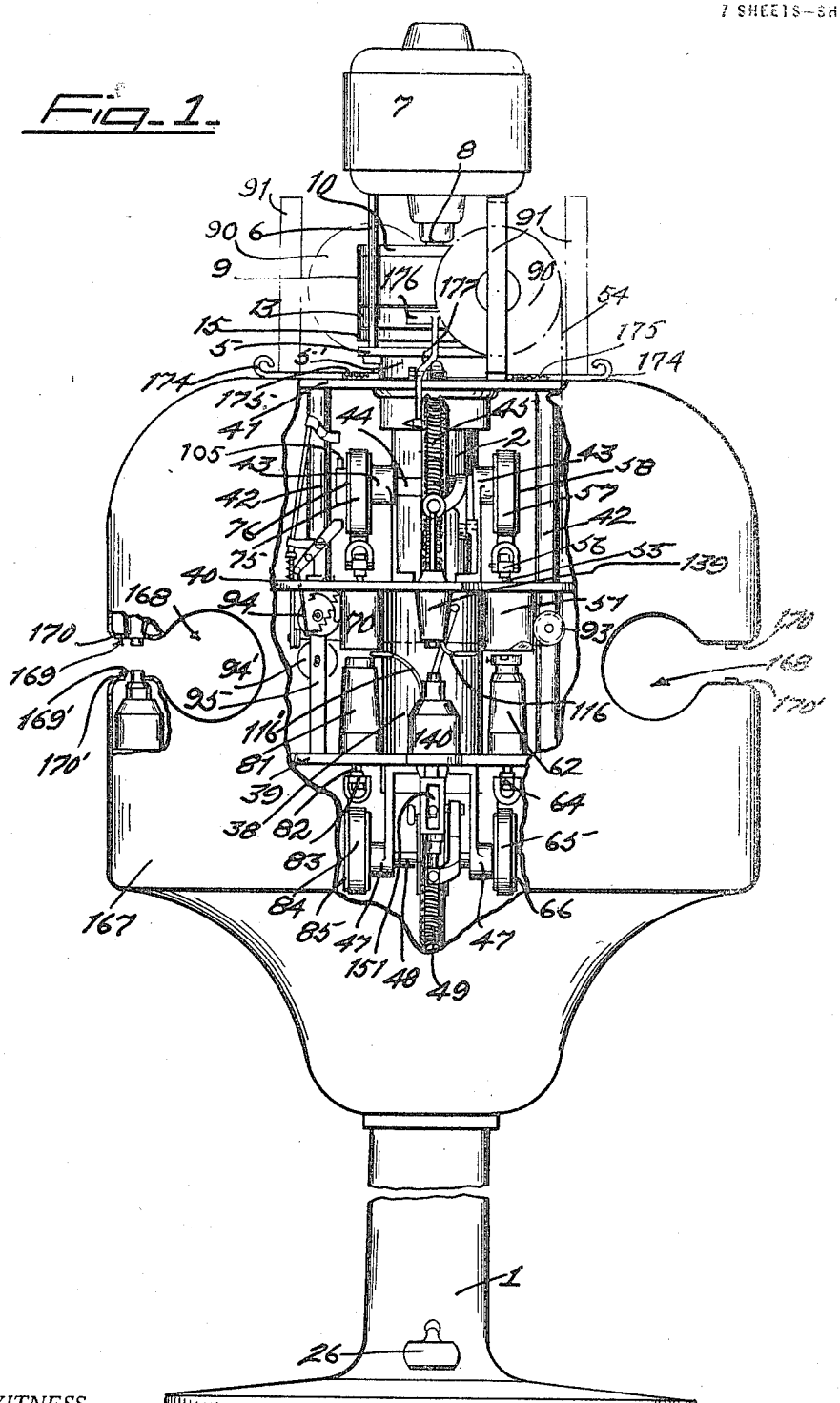
Figure 1 is a front elevation of the machine, a portion of the casing being broken away to show the interior working parts.
Figure 2:
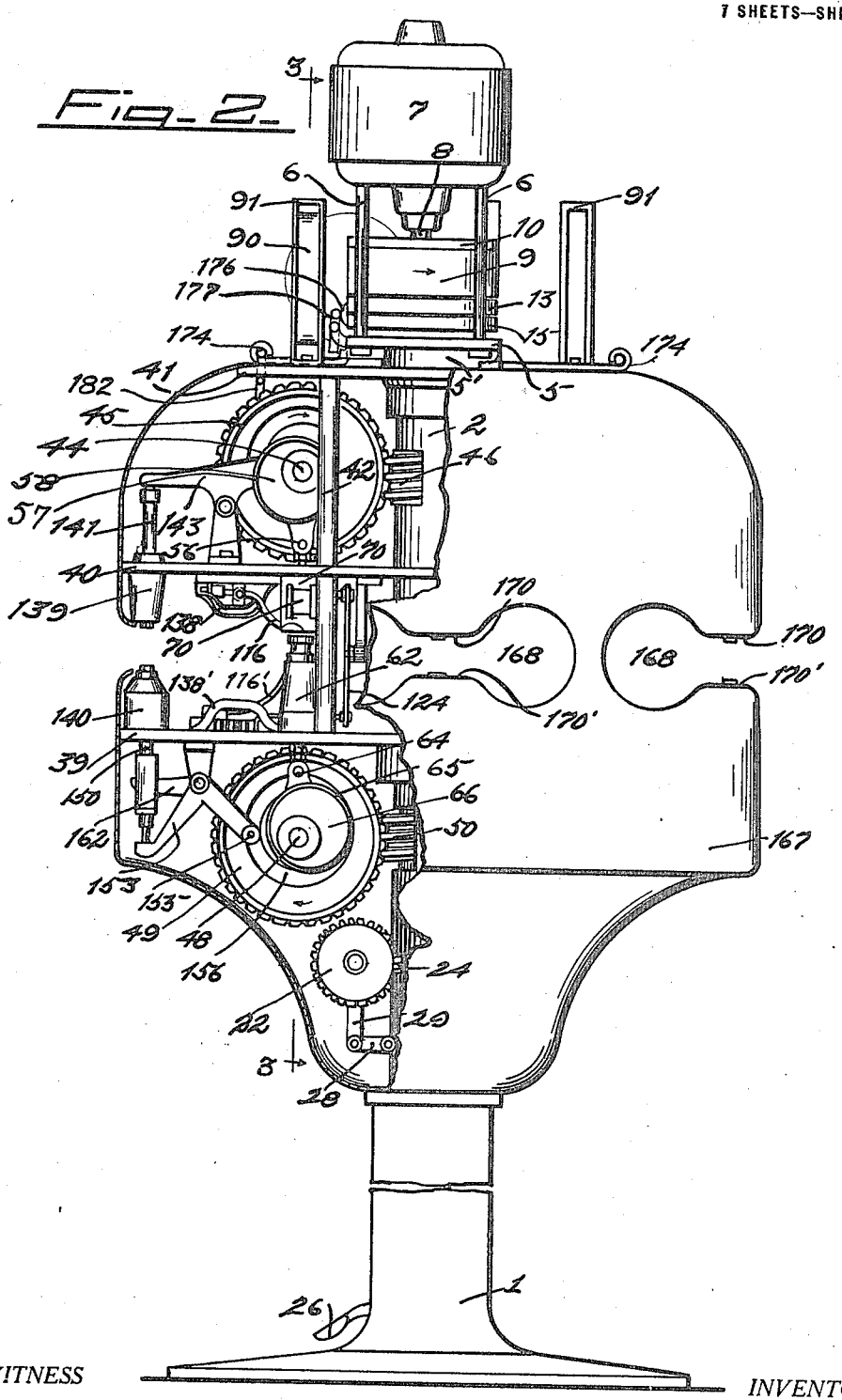
Fig. 2 is a side elevation of the same.

Referring now in detail to the drawings, the reference numeral 1, Figs. 1 and 2, designates a suitably constructed base, upon which is supported a vertical column 2. Said column is hollow, as shown particularly in Fig. 10, and has within it a vertical, eccentrically disposed drive shaft 3, carried in suitable bearings 4. The upper end of said column 2 carries an eccentrically disposed flange 5, Figs. 1, 2 and 10, formed integrally with a collar 5', and above which is supported, by means of rods 6, an electric motor 7, the shaft 8 of said motor being in vertical alinement with the main drive shaft 3.

A power-transmitting clutch is preferably interposed between the motor and the drive shaft 3, said clutch being shown in the drawings as of the magnetic type, comprising a hollow cylindrical shell 9, Figs. 10 and 11, open at the bottom, and having a top plate 10 secured to the motor shaft 8. Within said shell 9 are a plurality of electro-magnet coils 11 and 11', preferably arranged as shown in Fig. 11, each inner coil 11' having its core connected with the core of the adjacent outer coil 11 by means of a core bridge 12, so that said inner and outer coils form a horse-shoe magnet with its open poles facing downward. An armature disk 13, Fig. 10, is loosely mounted upon upwardly projecting pins 14 secured to a plate 15 carried by the upper end of the drive shaft 3. Said disk 13 is adapted to be lifted by the magnets into frictional contact with their pole shoes and the lower edge of the shell 9, and by said frictional contact to transmit power from the motor 7 to the drive shaft 3.

The magnetic clutch is controlled by means of a switch mechanism 16, Figs. 10 and 12, mounted upon the column 2 adjacent the lower end of the drive shaft 3. Said switch comprises a movable contact member 17, Fig. 12, pivoted at 18, and normally held in electrical contact with a stationary contact member 19 by a spring 20. The operation of said switch is effected by means of a face-cam 21 carried upon a worm wheel 22, Figs. 10 and 12, said worm wheel being mounted upon suitable brackets 23, Fig. 12, attached to the column, and driven by a worm 24 carried by the lower end of the drive shaft 3. Said cam engages the rearwardly extending arm 25 of the switch blade 17, and moves said blade out of contact with the stationary contact member 19, as shown in Fig. 12. Thus the switch is opened once for every revolution of the worm-wheel 22.

The switch is arranged to be closed, independently of the cam 21, by a pedal 26, Figs. 1, 2 and 10, mounted in the base 1, and connected by means of a rod 27 and a lever 28, Fig. 10, with a pusher rod 29, the latter being positioned beneath the actuating arm 25 of the switch blade 17, and adapted for engagement therewith. Said actuating arm 25 is hinged at 30, Fig. 12, so that when the pedal 26 is depressed, and the pusher rod 29 raised, said actuating arm 25 is lifted free from the cam 21, thereby allowing the switch to be closed by its spring 20. Thus, by the depression of the pedal 26, the switch may be closed, to energize the clutch and start the machine, whereupon the machine will run for one revolution of the worm wheel 22, until the cam 21 again operates to open the switch.

Current is supplied to the magnetic clutch through contact rings 31 and 31', Fig. 11, brushes 32 and 32', Fig. 10, and suitable connecting wires 33 and 33', indicated diagrammatically in Fig. 13. The current for said magnetic clutch is shown in said Fig. 13 as coming from a source of electricity 34, and flowing through a wire 35, the brush lead 33, the brush 32, the contact ring 31, the magnet coils 11 and 11', the ring 31', the brush 32', the lead 33', a wire 35', the switch contacts 17 and 19, and a return wire 36. Current from the same source may be used for operating the motor 7, and is led through wires 37 and 37', the latter forming, with said motor, a circuit separate from the magnetic clutch circuit, and not affected by the switch 16. Suitable control devices, not shown, may be included in the motor circuit.

The motor 7 runs continuously, and the magnetic clutch is used to start and stop the mechanism of the machine. The object of this construction is to provide means for starting and stopping the mechanism instantly, for a purpose to be hereinafter explained.

The gromet forming and setting mechanism is mounted, as before stated, upon a rotatable turret, said turret comprising a sleeve or hub 38, Fig. 10, surrounding the column 2, a pair of spaced horizontally disposed plates 39 and 40, Figs. 1, 2 and 10, carried by said hub 38, an upper horizontal plate 41, and vertically disposed spacing frame rods 42 between said plates, there being four of said rods in the machine herewith illustrated. Suitable thrust bearings 42', Fig. 10, are provided both above and below the rotatable turret.

Figure 3:
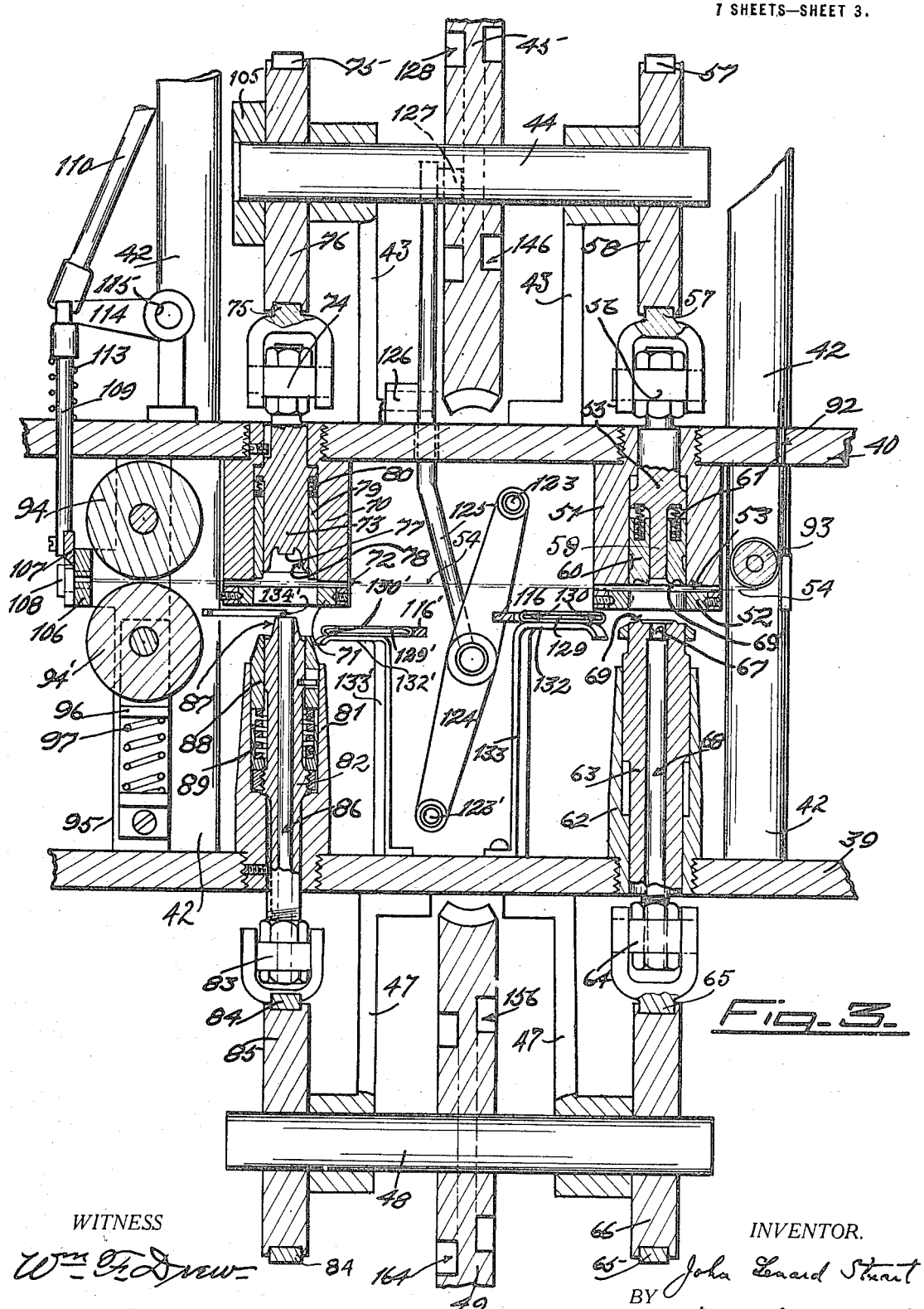
Fig. 3 is a vertical section, enlarged, of the gromet and washer forming dies, taken in the direction of the arrows on the line 3—3 of Fig. 2.

The forming and setting dies and punches are mounted upon the horizontal plates 39 and 40, and are actuated by the drive shaft 3 through the following mechanism:—Extending upwardly from the central plate 40 are a pair of journal brackets 43, Figs. 1 and 3, in which is rotatably carried a horizontal shaft 44, Figs. 1, 2, 3 and 4. Said shaft has fixed upon it, at its center, a worm wheel 45, which meshes with and is driven by a worm 46, Figs. 2 and 10, upon the drive shaft 3. A similar pair of brackets 47 extend downwardly from the lower plate 39, and support a horizontal shaft 48 lying in the same vertical plane as the upper shaft 44. Said lower shaft 48 is driven by a worm wheel 49, which meshes with a worm 50 upon the drive shaft 3. The worms and worm wheels for driving the two shafts 44 and 48 are identical in pitch and diameter, so that said shafts rotate in unison, and said worm gearing is so proportioned that said shafts 44 and 48 rotate in unison with the switch operating worm wheel 22.

The washer forming punch or die comprises a cylindrical sleeve or guide member 51, Fig. 3, secured to and extending downwardly from the central plate 40 at a point beneath the right-hand end of the shaft 44. A die ring 52 is carried within the lower end of said guide 51, and a transverse slot 53 is formed in said guide immediately above said die ring, through which is passed the web or strip 54 of metal from which the washers and gromets are formed.

Within said guide 51 is a vertically slidable die plunger 55, Fig. 3, connected by an adjustable pivotal connection 56 with a strap 57 surrounding an eccentric 58 mounted upon the horizontal shaft 44. The plunger 55 is formed with a central die 59 for punching the hole in the washer, and an annular die 60, surrounding said punch 59, and adapted to coöperate with the die ring 52 for punching the washer blank from the web 54. Said annular die 60 is backed by springs 61, and has a limited amount of vertical movement, against the compression of said springs, upon the central punch 59, and normally extends below the end of said punch, so that the blank is first punched from the web, and the hole punched therein afterward.

Secured to the lower turret plate 39, and extending upwardly therefrom in vertical alinement with the die just described, is a cylindrical guide 62, Fig. 3, within which is a vertically movable plunger 63, the latter being connected, through an adjustable pivotal connection 64, with the strap 65 of an eccentric 66 mounted upon the lower horizontal worm wheel shaft 48. The upper end of said plunger 63 is bored, as at 67, to form a die ring to coöperate with the punch 59 for punching the hole in the washer, and a passage 68 is formed lineally through said plunger to permit the escape of the waste blank punched from said hole. The upper end of said plunger is also suitably formed, as at 69, and the lower end of the upper annular die 60 is correspondingly formed, as at 69', so that the two coöperate to press the washer blank into the desired form.

The gromet forming die is similarly constructed. A cylindrical guide 70, Fig. 3, is secured to and extends downwardly from the central turret plate 40, beneath the left-hand end of the upper horizontal shaft 44. Said guide carries in its lower end a die ring 71, and a transverse slot 72 is provided immediately above said die ring, through which the metallic web 54 is passed. Within said guide 70 is a vertically movable plunger 73, whose upper end is connected, by means of an adjustable pivotal connection 74, with the strap 75 of an eccentric 76 mounted upon the shaft 44. The lower end of said plunger 73 is formed with a central punch 77 and a gromet forming face 78 adapted for coöperation with a lower die member, to be presently described, for punching the central hole in the gromet and for drawing said gromet to the desired form. An annular punching die 79 surrounds the lower portion of the plunger 73, and is normally held, by springs 80, with its lower end below the lower end of said plunger. Said annular die 79 coöperates with the stationary die ring 71 to punch the gromet blank from the web 54, before said blank is drawn to proper form and the central hole punched therein. Said annular die 79 also acts as a stripper to forcibly remove the gromet from the forming die.

A cylindrical guide 81, Fig. 3, is secured to and extends upwardly from the lower turret plate 39 in vertical alinement with the upper guide 70. A vertically slidable plunger 82 is carried within said guide 81, and is connected, by means of an adjustable pivotal connection 83, with the strap 84 of an eccentric 85 mounted upon the lower horizontal shaft 48. Said plunger 82 is hollow, as shown at 86, its upper end coöperating with the central punch 77 of the upper die plunger to punch the central hole in the gromet. The waste blank resulting from said punching is discharged through the bore 86 of said lower plunger.

The upper end of the plunger 82 is shaped, as at 87, to coöperate with the lower end 78 of the upper plunger to draw the central portion of the gromet to the desired form. An annular stripper ring 88 surrounds said lower plunger 82, and is normally held with its upper end projecting above the upper end of said plunger, by spring 89. Said stripper ring 88 coacts with the annular die 79 of the upper plunger to hold the outer edge portion of the gromet blank during the drawing of its central portion, and subsequently insures the removal of the gromet from the lower forming die 87.

It will be readily understood that the upper and lower die members are actuated by their respective eccentrics to coöperate properly to form the washers and gromets. In the case of the washer forming die, the washer blank is first punched from the web or strip by the initial downward movement of the plunger 55 and the annular die 60. The blank is then clamped between the lower end of said annular die 60 and the upper end of the lower plunger 63, and shaped by the faces 69 and 69', the upper and lower plungers being brought together for this purpose. Further movement of said plungers compresses the springs 61, and permits the central upper die 59 to enter the hole 67 in the lower plunger 63, thereby punching the central hole in the washer. Upon the separation of the plungers, which follows immediately, the washer is stripped off the central punching die 59 by the annular die 60, and allowed to rest upon the top of the lower plunger.

The gromet is similarly formed. The initial downward movement of the upper plunger 73 causes the annular die 79 to punch out a blank from the web. Said blank is then pressed between the approaching faces 78 and 87 of the upper and lower plungers respectively, and its central portion drawn to the desired shape, its edge portion being clamped and held substantially flat between the upper annular die 79 and the lower stripper ring 88. Just before the end of the drawing operation, the central hole is punched by the upper central die 77 entering the hollow end of the lower plunger. Upon the separation of the plungers, the gromet is prevented from clinging to either of the forming faces 78 and 87 by the upper annular die 79 and the lower stripper ring 88, and is left lying loosely upon the upper end of the lower plunger, or more properly, upon the upper end of said lower stripper ring 88.

The metallic web or strip from which the washers and gromets are made is carried upon a coil or reel 90, Figs. 1 and 2, mounted within a suitable holder 91 supported upon the upper turret plate 41. The web 54 is led downwardly from said reel 90, through an aperture 92, Fig. 3, in the central turret plate 40, under a guide roller 93, transversely through the slots 53 and 72 in the upper plunger guides 51 and 70 respectively, and between a pair of feed rolls 94 and 94', Figs. 1, 3, 8 and 9, suitably mounted in a bracket 95. The lower roll 94' is an idler, carried within a mounting 96, Figs. 3, 8 and 9, adapted for vertical movement within the bracket 95, and is pressed upward, to clamp the web between the two rolls, by a spring 97.

The upper feed roll 94 carries a ratchet 98, Figs. 8 and 9, which is engaged by a pawl 99. Said pawl, which is held in engagement with said ratchet by a spring 100, is carried upon the lower end of a rod 101 passing through an aperture in the central turret plate 40, and connected with a lever 102. The other end of said lever, which is fulcrumed at 103, carries a cam follower 104 adapted to be engaged by a cam 105 mounted upon the end of the upper eccentric shaft 44. A spring 100', Fig. 9, holds said cam follower in position for engagement with said cam. Thus, at the proper moment in the cycle of operations of the mechanism, that is immediately after the formation of a washer and a gromet by the respective dies, the feed roll 94 is rotated one-third of a revolution, which is sufficient to advance the web to a proper position for the formation of the next washer and gromet. It is understood, of course, that the washer and gromet forming dies are so placed relative to each other, that the holes in the web made by the washer forming die will not be brought under the gromet forming die.

The waste web, after passing between the feed rolls 94 and 94' is cut into short lengths, to enable more convenient disposal, by a cutter mechanism comprising a slotted stationary blade 106, Figs. 3, 8 and 9, secured to the turret frame member 42, and a movable blade 107 pivoted to said stationary blade at 108. Said movable blade 107 is actuated by a system of pusher rods 109 and 110, the latter being connected, at its upper end, to a lever 111, Figs. 8 and 9, whose inner end 112 is adapted to be engaged by the feed roll cam 105. A spring 113, surrounding the pusher rod 109, is provided to return the movable blade 107 to its upper position, and a rocker arm 114, pivotally mounted at 115, Figs. 3 and 8, is provided to prevent side thrust on said pusher rod 109.

Figure 4:
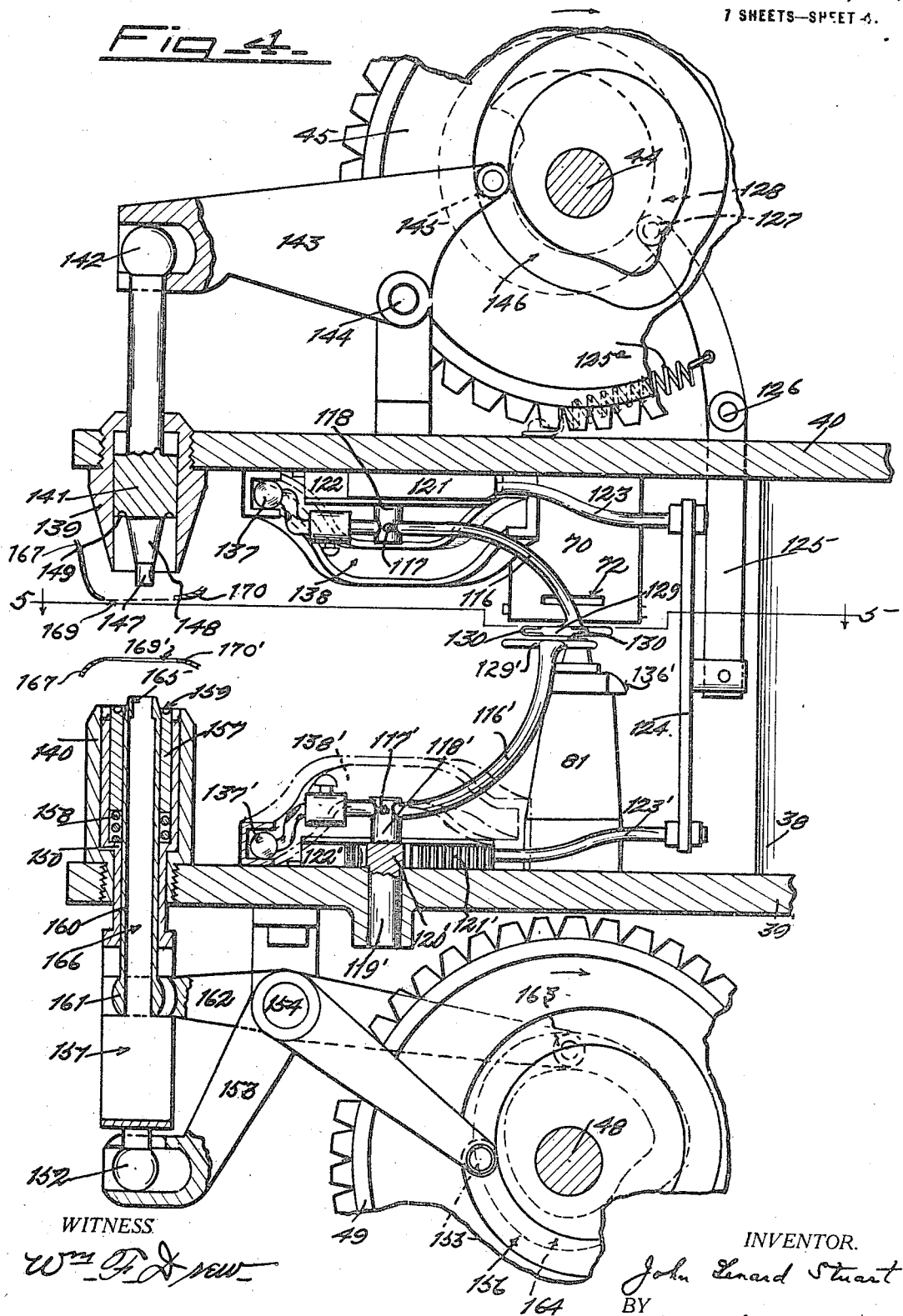
Fig. 4 is a part-sectional elevation, enlarged, of the punch and setting die, and the gromet and washer carrying means.

The washer and gromet are transferred from their respective forming dies to the setting die by a pair of similar carriers, comprising curved arms 116 and 116', Figs. 1, 2 and 4, pivotally mounted for swinging movement, at 117 and 117', Fig. 4, upon vertically disposed rotatable spindles 118 and 118' respectively, said spindles having bearings, one of which is shown at 119', in the turret plates 39 and 40 respectively. Said spindles are provided with gear pinions, one of which is shown at 120' in Figs. 4 and 5, adapted to be engaged and rotated by horizontally slidable rack bars 121 and 121', Fig. 4, carried within suitable guides 122 and 122'. Said rack bars are connected, by rearwardly extending rods 123 and 123', with the ends of a substantially vertically disposed bar 124, Figs. 3, 4 and 5, and said bar 124 is carried by the lower end of a lever 125, fulcrumed at 126, Figs. 3 and 4, upon the central turret plate 40, and carrying at its upper end a cam follower 127 adapted to lie within and follow a cam groove 128 formed in the side of the upper worm wheel 45. Thus by the action of the cam groove 128, the spindles 118 and 118' are rotated, simultaneously, and in opposite directions, to swing the carrier arms 116 and 116' forwardly.

The ends of the carrier arms 116 and 116' are forked, as shown at 129 and 129' in Fig. 5, and the inner edges of the fingers of said forks are grooved as at 130 and 130' in Figs. 3 and 5, to enable the washer and gromet respectively to be received and held between said fingers, suitably formed spring retaining devices 131 and 131', Fig. 5, being provided to retain said washer and gromet within said forked carriers. The forked ends 129 and 129' of said carriers normally rest upon guide members 132 and 132', Figs. 3 and 5, supported by brackets 133 and 133' respectively, rising from the lower turret plate 39, and lie in the positions shown in Figs. 3, 4 and 5, that is immediately behind the lower washer and gromet forming die plungers, and just above the upper ends thereof, so that, upon the forward movement of said carriers, the formed washer and gromet, which, it will be remembered, are lying upon their respective plungers, are picked up by said carriers. In order to insure that the gromet and washer will be fully seated within the forked ends of said carriers, I provide spring fingers 134 and 134', the former fixed upon the lower washer forming plunger guide 62, as shown in Fig. 6, and the latter fixed upon the frame post 42 adjacent the gromet forming plunger, as shown in Figs. 3, 5 and 9. Said spring fingers 134 and 134', lying in the path of the washer and gromet respectively, as the same are carried off their respective plungers, force said washer and gromet into the forked carrier ends, and give sufficiently to enable said washer and gromet to be carried over them. To assist the spring finger 134, I prefer to employ a spring pressed lip 135, Figs 5 and 6, mounted upon the upper end of the lower washer forming plunger 63, said lip providing an initial, and temporary, obstruction to the movement of the washer, to insure its entrance into the forked carrier end 129. I also employ inclined guide lips 136 and 136', Fig. 5, formed respectively upon the upper ends of the lower plungers 63 and 88, to guide the carrier ends 129 and 129' in their initial movement to pick up the washer and gromet.

The lower ends of the curved carrier arms 116 and 116' carry cam followers 137 and 137' respectively, adapted to ride within arcuate stationary cam grooves 138 and 138', Fig. 4, mounted respectively upon the central and lower turret plates 40 and 39. Said cam grooves, in addition to being circular in a horizontal plane, one thereof being shown in Fig. 5, are also arcuate in a vertical plane, as shown in Figs. 2 and 4, so that the carrier ends 129 and 129' are given a compound movement. The washer carrier 129, guided by the groove 138, follows a path which rises from the washer forming plunger 63, and subsequently descends as said carrier approaches the upper gromet setting die guide 139, Fig. 4. Similarly, the path followed by the gromet carrier 129' descends from the gromet forming plunger 88, and rises again as said carrier 129' approaches the lower setting die guide 140, Fig. 4, so that both washer and gromet are carried into vertically alined positions between said upper and lower setting die guides 139 and 140, the washer being above and the gromet below. The paths of said carriers are indicated in plan in Fig. 5 by the lines 129ª and 129ª'. A spring 125ª, Fig. 4, is provided in connection with the lever 125 for assisting the quick return of the carriers to their normal positions.

Within the upper setting die guide 139, which is secured to and extended downwardly from the central turret plate 40, as shown in Fig. 4, is a vertically movable plunger 141, whose upper end is freely connected, at 142, with a lever 143. Said lever is fulcrumed at 144, and carries upon its inner end a cam follower 145 adapted to lie within and follow a cam groove 146 formed in the face of the upper worm wheel 45, Figs. 3 and 4. Said plunger 141 carries upon its lower end a punch 147, Figs. 4 and 7, having a tapered upper portion 148, and an annular setting face 149.

Within the lower setting die guide 140, which is fixed to and extended upwardly from the lower turret plate 39, is a vertically movable plunger 150, Fig. 4, whose lower end is slotted, as at 151, and is pivotally connected, at 152 below said slotted portion, with a bell-crank lever 153. Said lever is fulcrumed at 154, and carries upon its inner arm a cam follower 155 adapted to lie within and follow a cam groove 156 formed in one face of the lower worm wheel 49, Figs 3 and 4.

The plunger 150 is cylindrical, as shown and has within it an annular setting die 157, Fig. 4, pressed upwardly by a spring 158, and formed upon its upper end with a setting face 159 adapted to coöperate with the face 149 of the upper plunger 141 to set the washer and gromet. Within said annular die 157 and the plunger 150 is a vertically movable punch 160, whose lower end is pivotally connected, at 161, within the slotted portion 151 of the plunger 150, with a lever 162. Said lever is fulcrumed at 154, and carries upon its inner end a cam follower 163 adapted to lie within and follow a cam groove 164, Figs. 3 and 4, formed in the face of the lower worm wheel 49 opposite to the cam groove 156. The upper end of said lower punch 160 is bored, as shown at 165 in Fig. 4, to receive the upper punch 147 and coöperate therewith for punching the hole in the material for the reception of the gromet, and said bore is enlarged and continued through said punch 160, as at 166, to permit the discharge of the waste punchings.

The entire mechanism is inclosed in a casing 167, Figs. 1 and 2, which is bent inwardly to form horizontal tangential tubular chambers 168, each lying behind the setting die, and in front of the forming dies. Apertures 169 and 169' are formed in the inwardly turned horizontal portions 170 and 170' of said casing, through which the setting dies operate. The tubular chambers 168 of said casing provide room for the bunching of a considerable quantity of the material to which the gromet is applied, in case it is desired to place the gromet at some distance from the edge of the material, and at the same time serve as shields to prevent said material from becoming entangled with the working parts of the machine. The casing does not interfere with the transfer of the washer and gromet from their respective forming dies to the setting dies, because, on account of the curved construction of the carrier arms 116 and 116' and the arcuate paths followed by the ends 129 and 129' of said arms, the washer is carried over the chamber 168, and the gromet under said chamber.

The washer, therefore, is brought, by its carrier 129, into a position in axial alinement with the upper setting die plunger 141, and between said plunger and the aperture 169 in the casing wall 170. At the same time, the gromet is brought, by its carrier 129', into a corresponding position above the lower plunger 150, and between said plunger and the casing aperture 169'. And during or before the formation and transfer of the washer and gromet, the operator has placed the material between the spaced casing walls 170 and 170', with the point at which the gromet is to be applied lying between the casing apertures 169 and 169'.

Immediately after the washer and gromet have been positioned as described, the upper setting die plunger 141, Fig. 4, moves downward, and the lower setting die plunger 150, with the central punch 160, moves upward, the upper punch 147 passing through the washer, the lower punch 160 passing through the gromet, and the two punches coöperating to punch the hole in the material. At this point in the cycle of operations, the carrier arms 116 and 116' are rapidly returned to their original positions, in readiness to pick up the next washer and gromet, when formed.

The setting mechanism is now in the position shown in Fig. 7. The washer 171 and the gromet 172, lie respectively above and below the material 173, all being held in proper alinement by the punches 148 and 160. The upper plunger 141 continues to move downward, and the lower plunger 150, carrying with it the annular die 157, continues to move upward, but the lower punch 160 reverses its direction and moves downward at the same rate of speed as the upper punch 147. The tapered portion 148 of said upper punch 147 thereupon expands the whole in the material 173, and the central portion 172' of the gromet 172 is forced through said expanded hole, and through the hole in the washer 171, and expanded preliminarily by said tapered upper punch portion 148. When said central gromet portion 172' meets the upper die face 149, it is curled outwardly, and finally clenched over the upper side of the washer 171 by the approaching die faces 149 and 159. The spring 158, Fig. 4, under the lower die 157, compensates for different thicknesses of material, without placing undue strains upon the mechanism, and insures the proper setting of the gromet in all cases. After the gromet has been set, the dies and punches are separated and retracted within the upper and lower portions of the casing, and the material may be withdrawn or moved into a new position for the next gromet.

As before stated, the machine herewith illustrated carries four sets of mechanism, each capable of forming and setting a washer and gromet, the only difference between the several sets of mechanism being in the size or type of washer and gromet formed and set thereby. In order to bring any one set of mechanism into operation, the turret is rotated, by hand or by any suitable means not shown in the drawings, to bring the worm wheels 45 and 49, Fig. 2, of the desired mechanism into engagement with the worms 46 and 50. Said worms, being mounted eccentrically with respect to the axis of the turret, can engage only one pair of worm wheels at a time, so that the rotation of the turret to bring one set of mechanism into operation automatically throws the remaining sets out of operation. The turret must be rotated, of course, only while the mechanism is at rest.

In order to retain the turret in the proper position for the operation of any one set of mechanism, a series of radially disposed bolts 174, Figs. 1 and 2, are provided, said bolts being slidably mounted on the upper turret plate 41, one above each set of mechanism, and pressed inwardly against the fixed upper flange 5' of the column 2 by means of springs 175, Fig. 1. A recess, not shown in the drawings, is provided in said flange 5', into which the bolts 174 may enter, to securely lock the turret in the proper position. To bring another set of mechanism into operation, therefore, the operator merely has to withdraw the bolt 174 holding the turret, and rotate said turret until the proper bolt engages the recess, without changing his position or that of the work.

It will be apparent that the operative mechanism must always come to rest at a definite fixed point in its cycle, and that this stopping point must be the same in each set of mechanism, in order to insure the ready engagement of the worm wheels with the driving worms, and to insure the proper timing of said worm wheels with the switch mechanism previously described. For this purpose a brake is provided, comprising a shoe 176, Figs. 1 and 10, adapted to frictionally engage the periphery of the clutch armature disk 13, and carried by a lever 177, fulcrumed at 178, Fig. 10, upon a bracket extending from the fixed plate 5. The lower end of said lever 177 is adapted for engagement by a lug 179, carried upon the inner end of a radially disposed bar 180, slidably mounted upon the upper turret plate 41. The outer end of said bar 180 is pivotally connected, at 181, with a bell-crank lever 182, fulcrumed at 183 upon a bracket fixed to said upper turret plate 41. Said bell-crank has its inner arm 184 lying in the path of a pin 185 extending laterally from the side of the upper worm wheel 45. Said pin is so placed upon said worm wheel that, when the cycle of operations of the mechanism is completed, and at the instant the switch 16 opens the clutch circuit, the arm 184 of the bell-crank is raised, thereby moving the bar 180 outwardly, and moving the brake shoe 176 into frictional contact with the clutch disk 13. When the switch is closed, by the operation of the pedal 26, the driving mechanism has sufficient power to start the drive shaft 3, even with the brake set, and to rotate the same until the movement of the worm wheel 45 releases said brake.

It will be seen that there is but one brake shoe 176 and lever 177, while each set of mechanism has associated therewith a sliding bar 180, and a bell-crank 182. The lugs 179 of said bars are therefore formed with inclined engaging faces, to enable them to properly engage the lever 177 as the turret is rotated, since each brake mechanism is in its set position when said turret is rotated, that is when the forming and setting mechanisms are in their positions of rest.

The operation of the machine may be briefly summarized as follows:—

Assuming that the motor 7 is running, and that the turret is in position for the operation of the desired set of mechanism, the operator places his work between the setting dies, and closes the clutch controlling switch by means of the pedal 26. The drive shaft 3 immediately begins to rotate, turning the worm wheels 45 and 49, with their respective eccentrics and cams, and the switch worm wheel 22. The washer and gromet forming dies are thereupon actuated to stamp out and form, from the metallic web 54, a washer and gromet respectively. It is preferable to construct the machine, and I have so illustrated it, so that the washer is formed slightly before the gromet, in order that the load upon the driving mechanism may be more evenly distributed. Immediately upon the separation of the forming dies, the web 54 is fed to a fresh position and its waste end cut off as described above, and the carriers 129 and 129' are actuated to transfer the washer and gromet to the setting die. Said setting die then operates, first punching the hole in the material, and holding the washer and gromet in position. At this point, the carriers return to their original positions, and the setting die continues to set the gromet and washer in the material. Finally, the setting die separates, the control switch is opened by the worm wheel 22, which has made one complete revolution, and at the same instant the brake 176 is set, to stop the machine, by the worm wheel 45, which has also made one complete revolution. The cycle of operations is thus complete, and the parts are in readiness for the beginning of a new cycle.

I claim:—

1. In a machine for the described purpose, means for forming and setting a gromet, and associated devices for positioning a coöperating washer in setting relation with said gromet.

2. In a machine for the described purpose, associated devices for making and setting a gromet and a washer for coöperation therewith.

3. In a machine for the described purpose, means for forming a gromet, associated devices for automatically positioning said gromet and a coöperating washer in applying relation to the work, and means for setting said gromet and washer.

4. In a machine for the described purpose, means for forming a gromet, means for setting the same, and associated devices for transferring the gromet from the forming means to the setting means.

5. In a machine for the described purpose, means for forming a gromet, means for forming a washer for coöperation with said gromet, means for setting said gromet and said washer, and associated devices for transferring said gromet and washer from the forming means to the setting means.

6. In a machine for the described purpose, means for forming a gromet, means for forming a washer for coöperation with said gromet, means for setting said gromet and said washer, associated devices for transferring said gromet and washer from the forming means to the setting means, and mechanism for actuating said means and devices in timed relation.

7. In a machine for making and setting gromets, means for forming a gromet, means for forming a washer for coöperation therewith, and associated devices for positioning said gromet and washer in axial alinement prior to the setting thereof.

8. In a machine for making and setting gromets, means for forming a gromet, means for forming a washer for coöperation therewith, associated devices for positioning said gromet and washer in spaced axial alinement prior to the setting thereof, and mechanism for actuating said forming means and said positioning devices in timed relation.

9. In a machine for making and setting gromets, means for forming a gromet, and associated devices for removing said gromet from said forming means and positioning the same in applying relation to the work, prior to the setting thereof.

10. In a machine for the described purpose, means for supporting and feeding a metallic web, means for forming a gromet and a coöperating washer therefrom, and associated devices for setting said gromet and washer.

11. In a machine for the described purpose, means for supporting and feeding a metallic web, means for forming a gromet and a coöperating washer therefrom, means for setting said gromet and washer, and associated devices for transferring said gromet and washer from said forming means to said setting means.

12. In a machine for the described purpose, means for forming and setting a gromet and a coöperating washer, mechanism for actuating said forming and setting means, and devices for automatically stopping said actuating mechanism upon the completion of the setting operation.

13. In a machine for the described purpose, means for forming and setting a gromet and a coöperating washer, driving mechanism for actuating said forming and setting means, and devices for automatically disconnecting said forming and setting means from said driving mechanism upon the completion of the setting operation.

14. In a machine for the described purpose, means for forming and setting a gromet and a coöperating washer, driving mechanism for actuating said forming and setting means, an electro-magnetic clutch connecting said forming and setting means with said driving mechanism, means for supplying electric power to said clutch to energize the same, and means for automatically cutting off said electric power from said clutch upon the completion of the setting operation.

15. In a machine for the described purpose, a plurality of substantially similar sets of mechanism, each comprising associated devices for forming and setting a gromet and a coöperating washer, and means for operating any of said sets of mechanism at will.

16. In a machine for the described purpose, a plurality of substantially similar sets of mechanism, each comprising associated devices for forming and setting a gromet and a coöperating washer, driving means common to all of said sets of mechanism, and devices for placing any one set of mechanism in operative relation with said driving means.

17. In a machine for the described purpose, a rotatable turret, a plurality of substantially similar sets of associated devices carried thereby for making and setting gromets and a coöperating washer, and driving means common to all of said gromet making and setting devices and adapted to be placed in driving relation with any one thereof by the rotation of said turret.

18. In a machine for the described purpose, a hollow central supporting member, a rotatable turret mounted thereon, a plurality of substantially similar sets of associated devices carried by said turret for making and setting gromets, a drive shaft mounted eccentrically within said supporting member, and adapted to be placed in driving relation with any one set of gromet making and setting devices by the rotation of said turret.

19. In a machine for the described purpose, means for forming a gromet, means for automatically punching a hole in the work, and associated devices for transferring the gromet from said forming means to the work.

20. In a machine for the described purpose, means for forming a gromet, means for automatically punching a hole in the work, associated devices for transferring the gromet from said forming means to the work, and means for setting said gromet within said hole.

21. In a machine for the described purpose, means for forming a gromet, a pair of oppositely operating reciprocating members adapted to punch a hole in the work and apply said gromet thereto and mechanism for operating said forming means and said reciprocating members in timed relation.

22. In a machine for the described purpose, means for forming a gromet and a washer therefor, associated devices for punching a hole in the work and automatically applying the gromet and the coöperating washer thereto.

23. In a machine for the described purpose, means for forming a gromet and a washer therefor, associated devices for punching a hole in the work, means for applying said gromet to said hole upon one side of the work and said washer upon the other side, and mechanism for automatically setting said gromet and washer within said hole.

24. In a machine for the described purpose, means for forming a gromet, means for automatically punching a hole in the work and applying said gromet thereto, and devices associated therewith for automatically removing the gromet from said forming means and positioning the same in applying relation to said work.

25. In a machine for the described purpose, means for forming a gromet and a washer therefor, means for automatically punching a hole in the work and applying the gromet and the coöperating washer thereto, and devices associated therewith for automatically positioning said gromet and washer in applying relation to said work.

26. In a machine for the described purpose, means for forming a gromet, means for removing said gromet from said forming means and positioning the same in applying relation to the work, and associated devices for holding said gromet in position, for punching a hole in said work, and for setting said gromet within said hole.

27. In a machine for the described purpose, means for forming a gromet and a washer therefor, means for positioning the gromet and the coöperating washer in applying relation to the work, and associated devices for holding said gromet and washer in position, for punching a hole in said work, and for setting said gromet and said washer within said hole.

28. In a machine for the described purpose, means for forming a gromet and a washer therefor means for positioning the gromet and the coöperating washer in applying relation to the work, devices adapted to be passed through said gromet and washer for punching a hole in the work, and means associated therewith for setting said gromet and washer within said hole.

29. In a machine for the described purpose, means for making a gromet, means for removing said gromet from said forming means and positioning the same in applying relation to the work, devices adapted to be passed through said gromet for punching a hole in the work, means for setting said gromet within said hole, and mechanism for operating said means and devices in timed relation.

30. In a machine for the described purpose, means for forming a gromet, means for removing said gromet from said forming means and positioning the same in applying relation to the work, devices adapted to be passed through said gromet for punching a hole in the work, means associated with said punching devices for setting said gromet within said hole, and mechanism for automatically operating said means and devices in timed relation.

31. In a machine for the described purpose, means for forming a gromet, means for punching a hole in the work and for setting said gromet therein, and associated devices for transferring said gromet from the forming means to the punching and setting means.

32. In a machine for the described purpose, means for forming a gromet, means for forming a washer for coöperation therewith, means for punching a hole in the work and for setting said gromet and washer therein, and associated devices for transferring said gromet and washer from the forming means to the punching and setting means.

33. In a machine for the described purpose, means for holding and feeding a metallic web, means for forming a gromet therefrom, devices for automatically cutting off the waste portion of said web after the gromet has been formed therefrom, means for punching a hole in the work and for setting a gromet therein, and associated devices for transferring said gromet from the forming means to the punching and setting means.

34. In a machine for the described purpose, means for holding and feeding a metallic web, means for forming therefrom a gromet and a washer adapted for coöperation therewith, devices for automatically cutting off the waste portion of said web after the gromet and washer have been formed therefrom, means for punching a hole in the work and for setting a gromet and washer therein, and associated devices for transferring said gromet and washer from the forming means to the setting means.

35. In a machine for making and setting gromets, means for forming a gromet, and an associated die for setting the same comprising alined oppositely operating reciprocating members adapted to coact to punch the gromet receiving hole in the work; and annular dies surrounding said punch members and adapted to coact to set said gromet within said hole.

36. In a machine for making and setting gromets, means for forming a gromet, and an associated die for setting the same comprising alined relatively reciprocating members adapted to pass through the hole in the gromet and to coact to punch the gromet receiving hole in the work and to initially expand the central tubular portion of the gromet; and annular dies surrounding said punch members and adapted to coact to set said gromet within said hole.

37. In a machine for making and setting gromets, means for forming a gromet, and an associated die for setting the same comprising alined relatively reciprocating members adapted to pass through the hole in the gromet and to coact to punch the gromet receiving hole in the work, one of said members having a tapered portion adapted to initially expand the central tubular portion of the gromet and an annular die face at the base of said tapered portion; and an annular die surrounding the other member, and lineally movable thereupon, said die being adapted to coact with the annular die face of the first member to set the gromet.

38. In a machine for making and setting gromets, means for forming a gromet, and an associated die for setting the same comprising alined relatively reciprocating members adapted to pass through the hole in the gromet and to coact to punch the gromet receiving hole in the work, one of said members having a tapered portion adapted to initially expand the central tubular portion of the gromet and an annular die face at the base of said tapered portion; a reciprocating sleeve surrounding the other member and movable independently thereof; an annular die carried by said sleeve and adapted to coact with the annular die face of the first member to set the gromet, and a cushioning spring interposed between said annular die and the carrying sleeve therefor.

39. In a machine for the described purpose, means for forming a gromet and a washer therefor; means for setting said gromet and washer, said setting means being spaced forwardly from said forming means; devices for transferring the gromet and washer from the forming means to the setting means; and a casing for inclosing the machine, said casing having a portion bent inwardly to form an enlarged chamber between said forming means and said setting means for the reception of the work, and said chamber being provided with apertures in its walls through which the setting means are adapted to operate.

40. In a machine for the described purpose, means for forming a gromet and a washer therefor; means for setting said gromet and washer, said setting means being spaced forwardly from said forming means; devices for transferring the gromet and washer from the forming means to the setting means; and a casing for inclosing the machine, said casing having a portion bent inwardly to form a narrow work receiving space in the region of the setting means, and an enlarged work receiving chamber between said setting means and said forming means, and having apertures in the walls of said narrow space through which the setting means are adapted to operate.

41. In a machine for the described purpose, means for forming a gromet and a washer therefor; means for setting said gromet and said washer, said setting means being spaced from said forming means; a casing for inclosing the machine, said casing having a portion bent inwardly to form a work receiving chamber between said setting means and said forming means, said chamber being provided with apertures in its walls through which the setting means are adapted to operate; and devices for transferring the gromet and washer, within said casing and around said work receiving chamber, from said forming means to said setting means.

42. In a machine for the described purpose, means for forming a gromet and a washer therefor; means for setting said gromet and said washer, said setting means being spaced from said forming means; a casing for inclosing the machine, said casing having a portion bent inwardly to form a work receiving chamber between said setting means and said forming means, said chamber being provided with apertures in its walls through which the setting means are adapted to operate; and swinging carrier arms for transferring the gromet and washer, within said casing and around said work receiving chamber, from said forming means to said setting means.

43. In a machine for the described purpose, means for forming a gromet and a washer therefor; means for setting said gromet and said washer, said setting means being spaced from said forming means; a casing for inclosing the machine, said casing having a portion bent inwardly to form a work receiving chamber between said setting means and said forming means, said chamber being provided with apertures in its walls through which the setting means are adapted to operate; and devices for transferring said gromet and washer, in curvilinear paths within said casing, one above said work receiving chamber and the other below the same, from said forming means to said setting means.

44. In a machine for the described purpose, means for forming a gromet; means for setting the same; and a forked carrier arm adapted to receive the gromet from the forming means and transfer the same to the setting means.

45. In a machine for the described purpose, means for forming a gromet and a washer therefor; means for setting said gromet and washer; and a pair of forked carrier arms adapted to receive the gromet and washer from the forming means, and position the same in setting relation within the sphere of action of the setting means.

In testimony whereof I have signed my name to this specification in the presence of two subscribing witnesses.

JOHN LENARD STUART.

Witnesses:
W. F. BOOTH, Jr.,
D. B. RICHARDS.